J. CONTE.
FEEDER FOR NUT DIPPING AND COATING MACHINES.
APPLICATION FILED JULY 30, 1914.
1,158,120.
Patented Oct. 26, 1915.
4 SHEETS—SHEET 2.
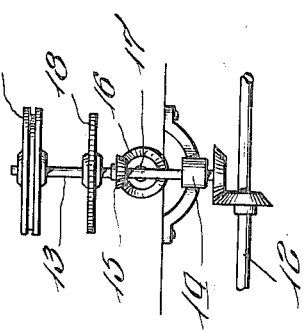
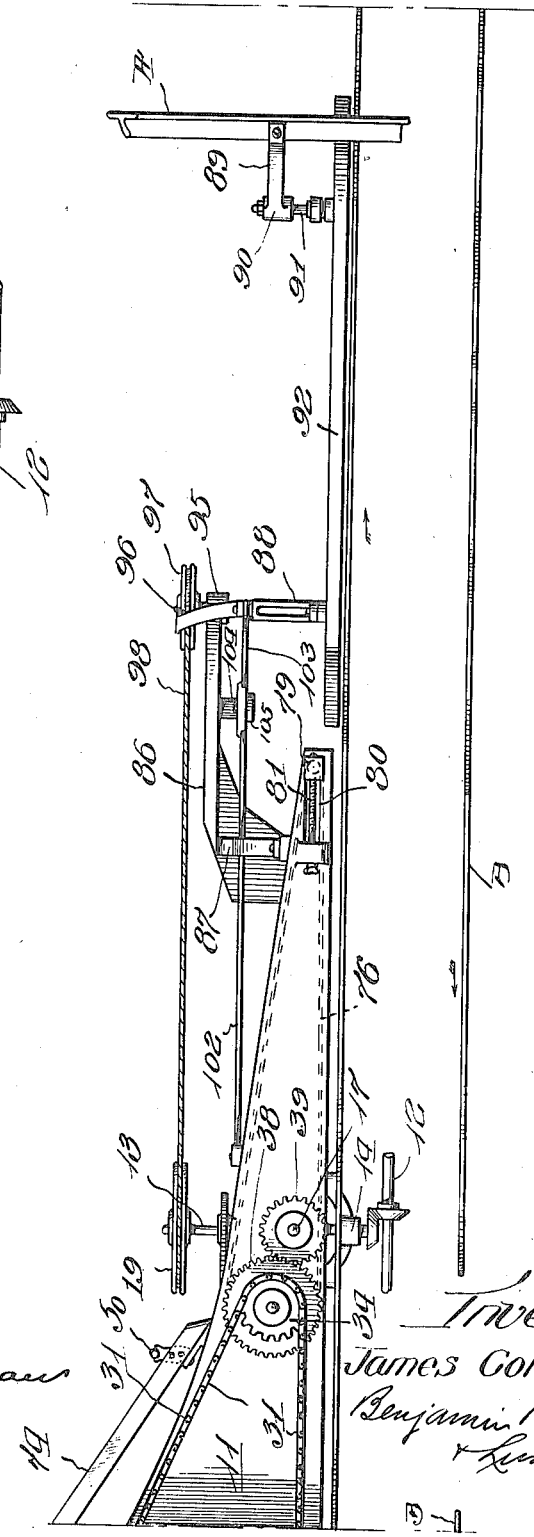

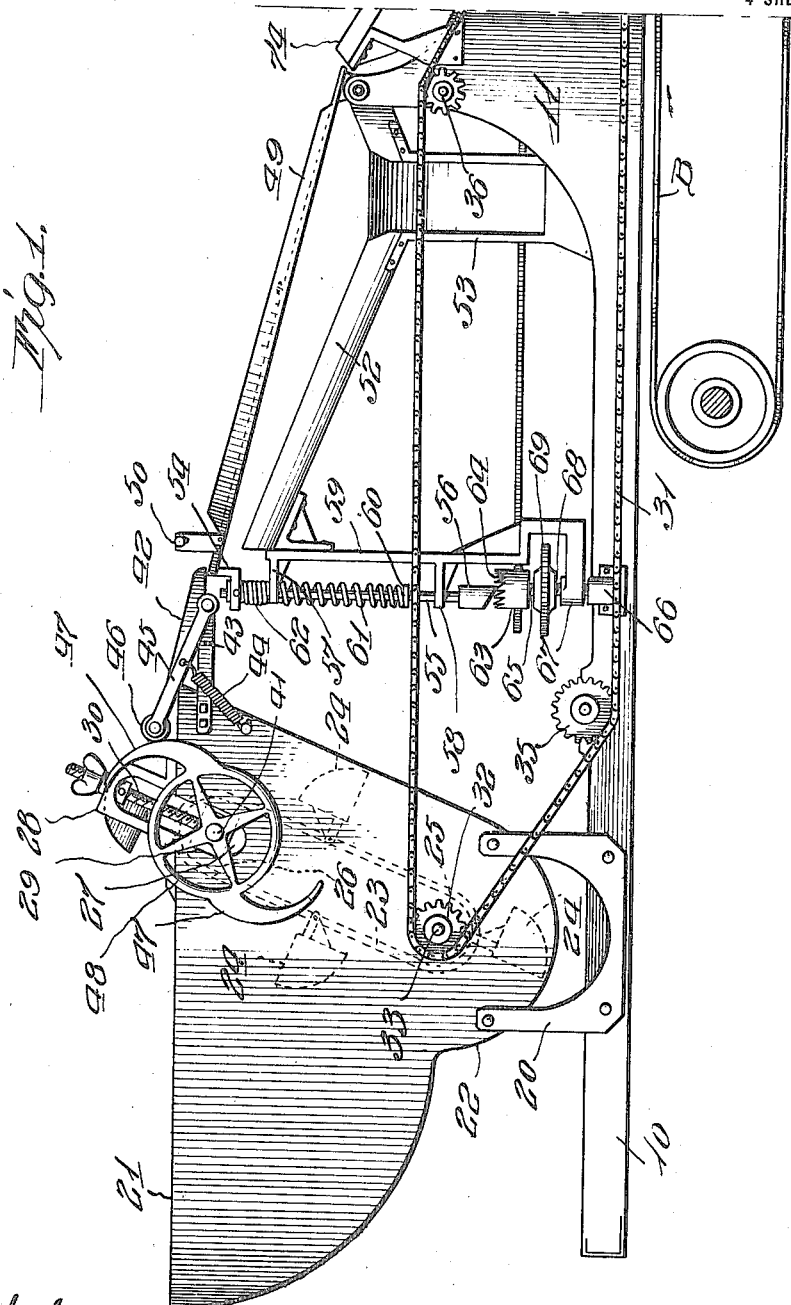

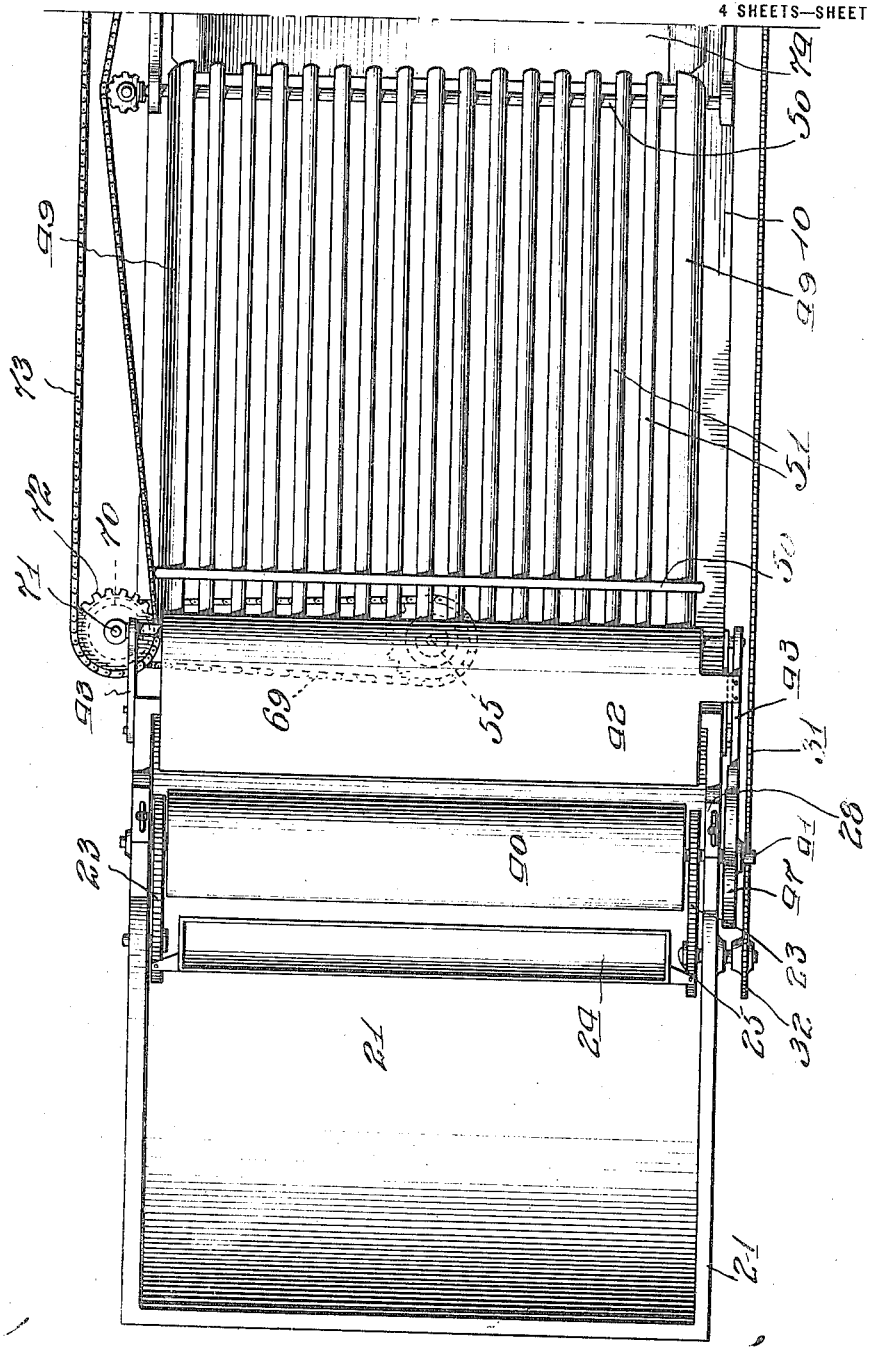

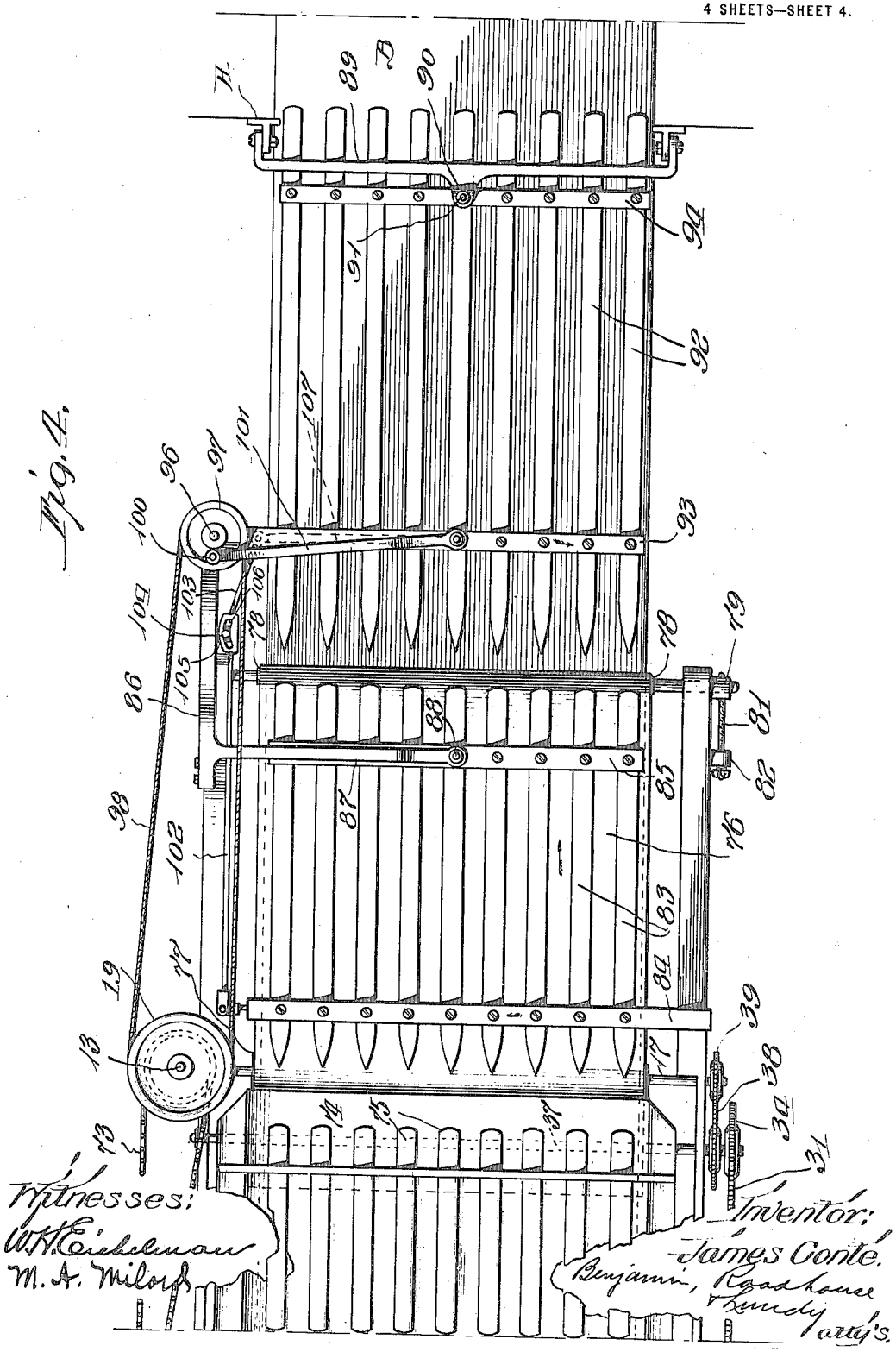

UNITED STATES PATENT OFFICE.

JAMES CONTE, OF CHICAGO, ILLINOIS.

FEEDER FOR NUT DIPPING AND COATING MACHINES.

1,158,120.  Specification of Letters Patent.  Patented Oct. 26, 1915.

Application filed July 30, 1914. Serial No. 854,049.

*To all whom it may concern:*

Be it known that I, JAMES CONTE, a citizen of the United States, residing at Chicago, in the county of Cook and State of Illinois, have invented certain new and useful Improvements in Feeders for Nut Dipping and Coating Machines, of which the following is a specification.

My invention relates to a mechanism for feeding nuts to a chocolate coating and dipping machine and more particularly to a machine that will sort and throw out defective nut kernels before reaching the coater.

Heretofore it has been the practice to feed mechanical nut coaters and dippers by hand and in order to feed rapidly it has been necessary to employ several attendants upon each side of the feed apron or conveyer of the coating machine. In addition to feeding the kernels upon the apron it has been the duty of these operatives to sort and throw out all defective kernels. Or when suitable mechanical feeding has been employed it has required the labor of several attendants to sort or pick out the defective or imperfect kernels while the mechanical feeder was in operation. The wage item for these operatives or attendants has been a source of considerable expense to manufacturers of chocolate coated nut confections, as well as a laborious and uncertain method of operation, and it is to overcome these disadvantages and reduce this expense that I have devised my feeder and sorter mechanism.

The particular object of my invention is the construction of a suitable mechanism that will effectively and automatically perform the sorting operation which has heretofore been done by manual labor.

Another object is to provide suitable devices whereby the nut kernels after being sorted will be arranged in rows and fed to shakers that convey the kernels to the dipper or coater.

A still further object is to so construct my invention that it may be attached at its discharge end to any well-known or convenient coating machine without the necessity of alteration or special parts for either device. And lastly it is an object of my invention to construct a machine that will not require the handling of the nut kernels by the operator; is so simple and easy to operate that only one attendant is required to manipulate it; is rapid in its operation, and economical to manufacture.

These, and other objects I prefer to accomplish by the means and in the manner hereinafter fully described and as more particularly pointed out in the claims, reference being had to the accompanying drawings forming a part hereof wherein similar reference characters indicate the same parts in the various figures.

In the drawings:—Figure 1 is a vertical side elevation of the outer or hopper end of my invention; Fig. 2 is a continuation of Fig. 1 showing the opposite or discharge end of the feeder and illustrating the manner of attaching my invention to a chocolate coater or dipper machine; Fig. 3 is a top plan view of the outer or hopper end of the machine as shown in Fig. 1; Fig. 4 is a top plan view of the discharge end of the machine as shown in Fig. 2, and Fig. 5 is a detail view of one of the drive shafts and connected elements.

Referring to the drawings, A, represents the receiving portion of any well-known chocolate coating or dipping machine and B is the usual conveyer apron forming a part of the same and leading thereto, that is driven thereby and which extends horizontally outwardly a distance to accommodate several operators upon each side whose duty it has been to place the perfect or integral nut kernels upon the same in spaced rows, so that each kernel was separated from the preceding and succeeding kernels a distance to be properly received by the machine.

Mounted in any suitable manner in front of the conveyer so that a portion thereof overhangs the same is the metal base or frame 10 of my sorting and feeding device. This frame is preferably of cast-metal, rectangular in shape, and its longitudinal sides are preferably increased in height about midway their length and slope toward their inner ends to provide a support 11 for one of the elements of my device to be hereinafter explained.

Journaled in suitable bearings (not shown) below the base frame 10 is the main drive-shaft 12 that is indicated diagrammatically for the purpose of clearness, and said shaft through suitable intermediaries drives a short shaft 13 the axis of which is vertically disposed and which is journaled in suitable bearings 14 on the side of the machine. Shaft 13 extends above the horizontal plane of the base frame and is provided with a beveled gear 15 meshing with a similar gear 16 upon the adjacent end of horizontally disposed shaft 17 that extends transversely across the base frame in a plane slightly above the latter where it is journaled in bearings upon the side of said base frame. The portion of vertical shaft 13 above bevel gear 15 has a sprocket 18 and a grooved pulley 9 secured thereto, and it is through the intermediary of the above described elements that the various parts of my invention are adapted to be operated.

Adjacent the outer end of the base frame are substantially U-shaped brackets 20, in the upper portions of the parallel arms of which a hopper 21 is mounted to receive the nut kernels as they come indiscriminately from the shellers. Said hopper is substantially triangular shaped in section and the lowermost portion 22 of its bottom is semi-circular as shown. The means for elevating and removing the nut kernels from this hopper comprises a suitable link-belt conveyer 23 upon which is mounted a plurality of buckets or scoops 24. The chains of this conveyer pass around sprockets 25 journaled at the radial centers of the semi-circular lower portion of the hopper from thence pass upwardly and around sprockets 26 mounted in bearings adjacent the upper edge of said hopper. I prefer to make these upper bearings adjustable and for this purpose an elongated inclined recess 27 is cut in the upper portion of the hopper side wall and the same is bridged by a suitable bracket 28 which latter is provided with an elongated slot that registers with and forms a continuation of the slot 27 in the hopper side wall. The bearing blocks 29 for the sprockets 26 are slidably mounted in this slot and are adjustable up or down by means of bolts 30 the lower ends of which are swiveled on said blocks 29 and the upper ends of which pass through screw-threaded bearings in the upper ends of said brackets 28.

The conveyer sprockets are driven by means of a chain 31 that passes around a sprocket 32 fast on the extended end of the sprocket-shaft 33 and the opposite end of said chain 31 passes around a sprocket 34 mounted adjacent the driving shafts of the machine, while mediate said sprockets 32 and 34 said chain engages suitable idlers 35 and 36 that are adapted to take up the slack therein. The driving sprocket 34 is secured on the end of a horizontally disposed shaft 37 extending across the base-frame and between said sprocket and the bearings in the base frame said shaft has a pinion 38 mounted thereon that meshes with and derives its motion from a pinion 39 fast on the adjacent end of shaft 17 hereinbefore mentioned.

The nut kernels upon leaving the buckets 24 gravitate and fall upon a roller 40 which latter is mounted on the same shaft 41 that carries the upper sprockets 26 of the conveyer. This roller tosses the nut kernels upon a shelf 42 that inclines upwardly from its lower end, where it is pivoted upon horizontal bars 43 projecting from the hopper, to a point adjacent the circumference of said roller 40 and is kept pressed toward said roller by a coiled contraction spring 44 having one end connected to the side-bars 45 of said shelf and its opposite end secured to the adjacent wall of the hopper.

One of the side-bars 45 has a bearing in its outer end in which an anti-friction roller 46 is journaled and which serves to raise the bars and shelf each time said roller is engaged by one of the cam arms 47 mounted upon the periphery of a spider wheel 48 that is secured to and rotates with shaft 41 outside the hopper. There may be two or more cam arms upon the wheel 48 and they are so arranged that one of said arms will engage the roller and lift the shelf after each bucket has discharged its load and begins to travel over the upper reach of the conveyer in order that said bucket will escape the shelf in its downward course, and so soon as the bucket has moved past the shelf the latter will be automatically dropped back in proper position to receive the load from the succeeding bucket.

Upon leaving the shelf 42 the nut kernels fall upon an assorting device where the broken and half-kernels are automatically ejected from the machine. This device comprises a suitable frame made up of side pieces 49 and end pieces 50 that is preferably rectangular shaped and is disposed in an inclined plane from its receiving end downwardly to its discharging end. In the space between the side pieces 49 is disposed a plurality of slats 51 that extend longitudinally of said frame and are spaced apart a distance sufficient to permit the imperfect (broken or halved) kernels to fall between said slats and cause the perfect kernels to rest upon and slide down the slats toward the coating device. Below the assorting frame is a suitable metal trough 52 upon which the imperfect kernels fall from said frame and which mediate its ends is provided with a vertically disposed chute 53 through which said imperfect kernels fall to a suitable receptacle (not shown) below the same. The assorting frame is preferably pivoted at its lower end to the wall 11 of the base frame as shown, while its upper end is adapted to be vibrated in a vertical direction as will now be described.

Secured to the upper edge of the frame in any suitable manner is a substantially L-shaped bracket 54 to which is secured a vertically disposed vibratory bar 55 that has a wedge-shaped enlargement 56 upon its lower end and which is journaled mediate its ends in upper and lower bearings 57 and 58 respectively projecting laterally from a standard 59 that is secured to the base 10 at its lower end and at its upper end supports the adjacent end of the trough 52 above mentioned. An adjustable collar 60 is mounted upon this vibratory bar 55 between its bearings and forms the lower seat for a coiled expansion spring 61 surrounding said bar between said collar and the upper bearing 57. Between the upper bearing 57 and bracket 54 said bar is surrounded by a smaller but weaker coiled expansion spring 62 that is adapted to cushion the vibrations of the assorting frame and vibratory bar.

The means for causing the vibration of bar 55 comprises a rotatable disk 63 that is provided with serrations or teeth 64 upon its upper face, which teeth are adapted to engage the wedge face of the enlargement 56 on the lower end of said bar. Said disk 63 is rotated by a vertically disposed spindle 65 upon the upper end of which said disk is secured and which is mounted in bearings 66 secured to the side of the base frame 10 and in bearings 67 in the lower end of the standard 59. A sprocket 68 is mounted upon the spindle between bearings 67 and the disk 63 which is driven by a chain 69 extending to the side of the base frame where it engages a sprocket 70 mounted upon an idle spindle 71. Above sprocket 70 is a larger sprocket 72 that meshes with a drive-chain 73 which latter derives its motion from the sprocket 18, mounted on the vertical short-shaft or spindle 13 hereinbefore described.

Upon leaving the assorting frame the perfect kernels slide upon a stationary metal tray 74 that extends transversely across the apparatus and is provided with substantially parallel corrugations or ridges 75 that are disposed longitudinally of the apparatus and between which the kernels are adapted to gravitate. The inclination of this tray is considerably greater than that of the assorting frame so that the kernels will be given impetus sufficient to convey them on a short conveyer apron 76 that passes under the lowermost edge of said tray. The end of the conveyer adjacent the end of the tray passes around a drive roller 77 mounted on shaft 17 between the bearings of the latter while the opposite end of said conveyer which is in a horizontal plane slightly below that of the axis of said drive roller and passes around a small adjustable roller 78. The shaft of roller 78 is journaled in movable bearing blocks 79 that slide in guideways 80 formed by cutting horizontal lateral slots in the side members of the base-frame adjacent the ends thereof, and said blocks are adjusted by means of bolts 81 having swiveled connection with said blocks and passing through screw-threaded lugs 82 projecting laterally from the base-frame adjacent one end of the slats. The upper stretch of this conveyer travels toward the coating machine as indicated by the arrow and its lower stretch is in a horizontal plane slightly above the upper stretch of the feed apron B of said coating machine which likewise travels in the same direction but at a greater speed.

Mounted above and preferably in contact with conveyer 76 is a pivoted shaker frame that comprises a plurality of relatively wide parallel spaced slats 83 that are pointed at their outer ends and are secured to transverse forward and rear end pieces 84 and 85 respectively. A substantially L-shaped bracket 86 having an elongated lateral arm 87 is bolted to the base frame adjacent its end and said arm is provided at its end with a bearing boss 88 to which the shaker frame is pivotally secured. Secured to suitable adjacent members of the coating machine slightly above the apron B thereof is a suitable yoke 89 that is provided about midway its length with a lateral horizontal boss 90 from which latter a vertical stud 91 depends. This stud carries upon its lower end a supplementary shaker frame constructed similar to the first-mentioned shaker frame and consisting of a plurality of horizontally arranged longitudinally disposed parallel slats 92 that are pointed at their outer ends and are connected together in spaced relation to each other by means of transverse members 93 and 94. The parallel slats 92 are preferably just above the plane of the upper stretch of the conveyer B so that the kernels that have been discharged thereupon may be kept in alinement in parallel rows up to the time they reach the treating element of the coating machine.

The outer end of L-shaped bracket 86 is provided with a vertically disposed bearing boss 95 in which the spindle 96 of a pulley 97 is journaled and said pulley is driven by a belt or strap 98 that passes around the same and a pulley 19 upon the upper extended end of spindle 13 hereinbefore described. A crank pin 100 is secured eccentrically to said pulley 97 and a downwardly curved link 101 has one of its ends connected thereto and its opposite end pivotally connected to the shaker frame cross bar 93 as shown so that the rotation of said pulley will reciprocate said frame laterally across the conveyer B as will be understood.

A bell-crank lever having a long arm 102 and a short arm 103 is slidably mounted upon a pivot 104 projecting upwardly from a lug 105 on bracket 86 and passing through a slotted bearing 106 at the elbow of said arms 102 and 103. The free end of arm 103 is connected by a bar 107 to the adjacent cross member 93 of the inner shaker frame so that when the latter frame is moved a slight distance in the one direction or the other the outer shaker frame will be moved slightly in a direction opposite thereto, as indicated by the arrows upon cross members 93 and 84.

From the above it will be understood that the nut kernels after being discharged from the hopper 21 will be sorted upon the vibratory frame adjacent said hopper, the imperfect kernels being permitted to fall between the slats 51, after which the perfect kernels will gravitate upon the corrugated or grooved tray where they become bunched in rows. These rows of kernels are received upon the apron 76 and during their travel between the slats 83 of the outer shaker frame become slightly separated from each other owing to the lateral vibration of the frame, whereupon they fall off the end of said apron onto the conveyer B of the coating machine which is traveling faster than apron 76 and thereby spaces said kernels farther apart. Up to this time the kernels have been in rows and the kernels in each row have been irregularly spaced apart but upon reaching the last shaker frame which still further agitates them they will become approximately evenly spaced and ready to be fed to the coating element direct from the conveyer B.

While I have herein illustrated and described a specific manner and means of carrying out my invention it, of course, is obvious to others skilled in the art to which it appertains that various modifications and refinements of the same are possible without departing from the spirit of my invention, and I, therefore, desire it understood that all such changes and variations are included within the scope of my claims.

Having thus described my invention, what I claim as new and desire to secure by Letters Patent, is:—

1. In a device of the character described comprising in combination, a plurality of consecutively arranged frames, each frame composed of parallelly disposed slats suitably spaced and the slats of said frames being in alinement with one another, means for delivering nut kernels upon the first of said frames, means for imparting a vertically reciprocable vibratory movement to said first frame, means for horizontally reciprocating the remaining frames simultaneously with and in opposite directions to one another, and means traveling adjacent said remaining frames adapted to carry said kernels therethrough.

2. In a device of the character described comprising in combination, a plurality of consecutively arranged frames, each frame composed of parallelly disposed slats suitably spaced and the slats of said frames being in alinement with one another, means for delivering nut kernels upon the first of said frames, means for vibrating said first frame, means for reciprocating the remaining frames in opposite directions to one another, and means traveling adjacent said remaining frames adapted to carry said kernels therethrough.

3. In a device of the character described comprising in combination, a plurality of consecutively arranged frames composed of parallelly disposed slats, means for delivering nut kernels upon the first of said frames, means for vibrating said first frame, means for reciprocating the remaining frames, and means traveling adjacent said remaining frames adapted to carry said kernels therethrough.

4. In a device of the character described comprising in combination, a longitudinally disposed plurality of frames arranged end to end and consisting of parallelly disposed slats, means for delivering nut kernels upon the first of said frames, means for vibrating said first frame, means for reciprocating the remaining frames in opposite directions, and a device to carry said kernels therethrough.

5. In a device of the character described comprising in combination, a plurality of consecutively arranged frames composed of parallelly disposed slats suitably spaced in alinement with one another, means for delivering nut kernels upon the first of said frames, means for horizontally reciprocating the remaining frames in directions opposite to one another, and means traveling adjacent said remaining frames adapted to carry said kernels therethrough.

In testimony whereof I affix my signature in the presence of two witnesses.

JAMES CONTE.

Witnesses:
E. K. LUNDY, Jr.,
WM. HAROLD EICHELMAN.